United States Patent [19]

Weiblen

[11] Patent Number: 4,574,439
[45] Date of Patent: Mar. 11, 1986

[54] DEEP BORING MACHINE

[75] Inventor: Richard Weiblen, Münsingen-Dottingen, Fed. Rep. of Germany

[73] Assignee: TBT Tiefbohrtechnik GmbH & Co. KG, Fed. Rep. of Germany

[21] Appl. No.: 649,344

[22] Filed: Sep. 11, 1984

[30] Foreign Application Priority Data

Jul. 24, 1984 [DE] Fed. Rep. of Germany ....... 3427212

[51] Int. Cl.⁴ .............................................. B23B 7/14
[52] U.S. Cl. .................................. 29/27 A; 29/27 R; 408/56; 408/705
[58] Field of Search ...... 29/26 R, DIG. 71, DIG. 88, 29/56.5, 27 A, 27 R; 408/56, 72 R, 82, 129, 705; 82/2.5, 5

[56] References Cited

U.S. PATENT DOCUMENTS

| 3,502,124 | 3/1970 | Mater | 408/56 |
| 3,785,227 | 1/1974 | Wolff | 82/2 R |
| 3,796,116 | 3/1974 | Spreitzer | 82/2 R |
| 3,926,078 | 12/1975 | Ishizuka et al. | 82/2.5 |
| 4,377,023 | 3/1983 | Boesch | 29/27 R |
| 4,405,266 | 9/1983 | Hansen et al. | 408/56 |

FOREIGN PATENT DOCUMENTS

| 2208508 | 8/1973 | Fed. Rep. of Germany | 29/27 R |
| 2915381 | 10/1980 | Fed. Rep. of Germany | 29/27 R |

Primary Examiner—William R. Briggs
Attorney, Agent, or Firm—Jones, Tullar & Cooper

[57] ABSTRACT

A deep boring machine is described which has a spindle unit (2) with a horizontal spindle shaft (40) for receiving a boring tool (50). The spindle unit is horizontally displaceable on a machine bed (1) and is driven by a spindle drive mechanism (2). The boring head (6) is guided, upon initial boring of the workpiece (11), in a jig bushing (7) which is disposed in a jig bushing holder (13). The jig bushing holder (13) is displaceable on a guide (25, 26) in the direction of the spindle shaft (40). The guide (25, 26) is disposed above and offset parallel ($h_1$, $h_2$) from the spindle shaft (40) and extends at least partly beyond the machine bed (1). A workpiece clamping table (19) is disposed adjoining the machine bed (1) and is adjustable independently thereof.

6 Claims, 2 Drawing Figures

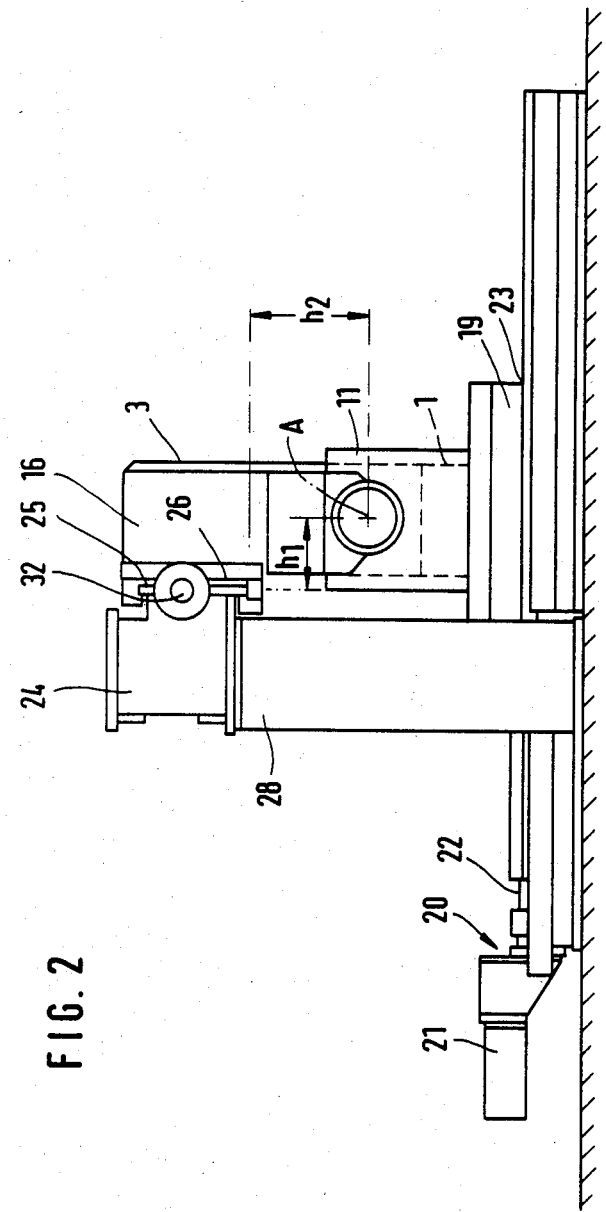

DEEP BORING MACHINE

BACKGROUND OF THE INVENTION

The present invention relates to a deep boring machine having a spindle unit which is horizontally displaceable on a machine bed and is driven by a spindle drive. The spindle unit has a horizontal spindle shaft for receiving a boring tool, the head of which when beginning to bore a workpiece is guided in a jig bushing disposed in a jig bushing holder that is displaceable in the direction of the spindle shaft. Deep boring machines of this kind are known.

In these deep boring machines, the clamping table or clamping stock is located in the same plane in which the jig bushing holder is also displaceable. Accordingly, the possibilities for clamping the workpieces are necessarily considerably restricted. In particular with very small workpieces, one must approach quite close to the edge of the clamping table in order to reach the clamped workpiece with the jig bushing holder at all. In specialized machining processes, such as pull boring, a bracing counter-holder must also be used. The counter-holder must rest on the other side of the workpiece. This can usually be accomplished only with a lantern that projects out a long way.

Other disadvantages are associated with this problematic clamping of the workpiece, such as the transference of spindle drive vibrations onto the clamping table, guide carriages and counter-holder carriages and insufficient rigidity of the clamping, in the event that clamping must be effected outside the center of the clamping table.

OBJECT AND SUMMARY OF THE INVENTION

It is accordingly a principal object of the present invention to further develop a deep boring machine of the general type described above such that even workpieces which previously could not be clamped onto known deep boring machines can be machined. In particular, the deep boring machine is intended to be suitable also for machining small workpieces.

Another object of the present invention is to make it possible to machine workpieces in which the distance between the surface suitable for clamping and the spindle shaft is greater than the height of the deep boring machine spindle above the clamping surface disposed on the machine bed.

In accordance with the present invention, these objects are attained by providing that the jig bushing holder is displaceable on a guide which is disposed above, and offset parallel from, the spindle shaft and extends at least partly beyond the machine bed in the direction of the spindle shaft, and that a workpiece clamping table extends in this direction, adjacent to the machine bed but adjustable independently thereof.

An advantageous embodiment of the present invention provides that a counter-holder is also displaceably disposed on the guide, and that the jig bushing holder and the counterholder can be displaced independently of one another by appropriate actuating drive means.

Hence the present invention encompasses the concept of making the jig bushing carrier, on the one hand, and the counter-holder on the other displaceable as needed along a type of portal in the direction of the spindle shaft, which at the same time is the direction of feed, the portal being laterally offset relative to the spindle shaft. The two units are displaceable independently of one another and it is thus possible, without the restrictions in clamping referred to above, to position them with respect to a workpiece such that they abut tightly against it and press against it. The workpiece, meanwhile, can be clamped in an optimal position on a workpiece clamping table that is to be disposed separately from the machine bed and that is adjustable in all three coordinate directions.

Considerable advantages are thereby attained. Worthy of particular mention are the maximal travel distances of the displaceable jig bushing holder and counter-holder. In each case, the total surface area of the workpiece clamping table can be utilized. Various bore-starting situations are possible in one workpiece clamping position, without having to make the jig bushing longer. This is particularly true for the pull boring method already mentioned (explained with reference to FIG. 1). The apparatus is furthermore suitable for automatic loading and unloading of the workpieces when the jig bushing holder, and the counter-holder are moved apart as needed along the rail disposed on the "portal".

As a result of the independence of the workpiece clamping table and the guidance of the guide carriage and the counter-holder carriage from the machine bed, machining is not affected by these elements and increased precision is thereby attained. The apparatus has a shorter overall length because of the separation between the machine bed and the guidance of the jig bushing holder and the counter-holder as needed. Furthermore, a headstock for rotating workpieces can also be mounted on the displaceable counter-holder.

One exemplary embodiment of the present invention and further advantageous developments thereof are described in greater detail below, referring to the drawings.

BRIEF DESCRIPTION OF THE DRAWINGS

FIG. 2 is a view in the direction of the arrows II—II of FIG. 1.

DESCRIPTION OF THE PREFERRED EMBODIMENT

Figure 1:
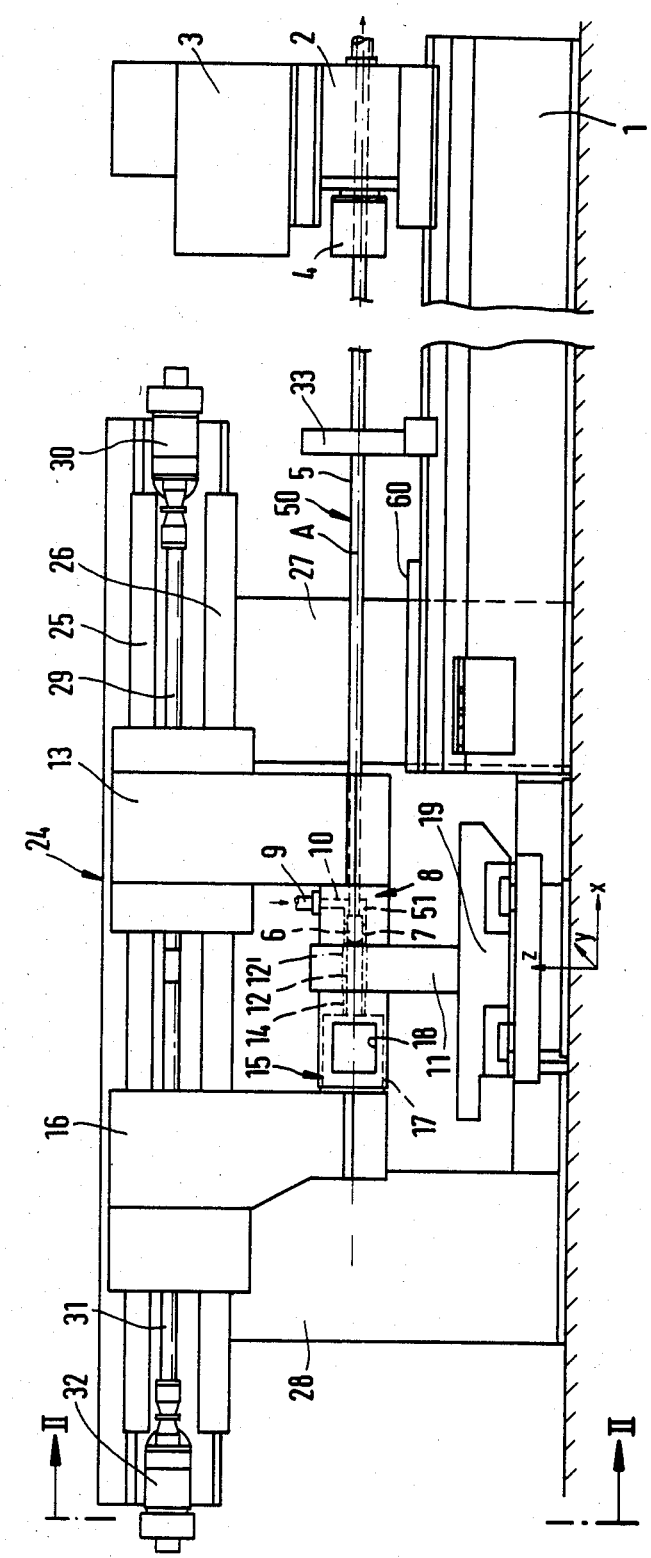
FIG. 1 illustrates a longitudinal elevational view of an exemplary embodiment of the present invention.

FIG. 1 shows a deep boring machine including a machine bed 1, a spindle unit 2, a spindle drive 3, and a spindle shaft 40. A boring tool 50, comprising a boring tube 5 and a boring head 6, is received in the spindle unit 2 by means of clamping devices 4. The boring head 6 is guided in a jig bushing 7. The jig bushing 7 is located in the drilling oil supply apparatus 8, to which drilling oil is delivered via a connection 9 into a pressure chamber 10, shown schematically by dashed lines.

The process involved here is accordingly deep boring by the BTA method (Boring and Trepanning Association). In this method, the deliver of drilling oil to the boring location is effected through an annular chamber 51 between the outside of the boring tube 5 and the inside of the bore (or when starting to bore, the jig bushing 7); the drilling oil is removed from the boring location through the internal conduit of the boring tube 5. The drilling oil serves to cool and lubricate the boring location as well as to carry away the chips. During feeding, the bore 12 is bored in the workpiece 11 from right to left as seen in FIG. 1. The drilling oil supply apparatus 8 is secured on a jig bushing holder 13.

The exemplary embodiment relates to the boring of a bore by the pull boring method. In other words, after the bore 12 is initially formed from right to left in the workpiece 11—beginning with the position of the boring tool as shown in FIG. 1—the boring head 6 is received in the guide bushing 14. This guide bushing 14 is disposed on a so-called lantern 15, which is disposed on the counter-holder 16. The lantern 15 has a hollow chamber 17 in its interior, from left to right adjacent to the guide bushing 14. The hollow chamber 17 is accessible from the outside through openings 18. If after the bore 12 is formed the boring head 6 is displaced toward the left in FIG. 1 beyond the guide bushing 14, then it can be changed inside the lantern 15. It is replaced by a boring head with a somewhat larger boring diameter, the bits of which are located on the righthand side, as seen in FIG. 1, so that when the boring head is moved from left to right in FIG. 1 the bore 12 is widened to the diameter 12' indicated by dot-dash lines. Since the boring tool is pulled in this process, the method is called the "pull boring method". A critical factor in this method is the contact of the drilling oil supply apparatus 8, having the jig bushing 7, with one side of the workpiece and the contact of the guide bushing 14 in the lantern 15 with the other side of the workpiece. In other words, both the jig bushing holder 13 and the counter-holder 16 must be moved, with the devices carried by them (drilling oil supply apparatus 8 and lantern 15), toward the workpiece 11 from both sides and pressed against it.

The workpiece 11 is clamped on a workpiece clamping table 19. This table is movable by its own means in all three coordinate directions, that is X, Y and Z. Of the devices required to do so, the means for displacement in the Y direction are shown in FIG. 2, identified by reference numeral 20. The displaceability is assured by flat guides of a kind that are available on the market and is effected by motor-driven rotating spindles. Thus the means 20 for moving the workpiece clamping table 19 in the Y direction has the drive mechanism 21, the spindle 22 and the guide rails 23. The other displacement means are also conventional and therefore are not shown in the drawing, for the sake of simplicity.

The jig bushing holder 13 and the counter-holder 16 are displaceably disposed on guides 25 and 26. The displacement of the jig bushing holder 13 and of the counter-holder 16 can be effected independently of one another.

The two guides 25 and 26 are part of a bridge 24, which is supported by two pillars 27 and 28. As shown in FIG. 2, the position of the guide 26 is offset parallel to and facing the spindle shaft 40 by the distance $h_1$ laterally and the distance $h_2$ in terms of height. Thus the two pillars 27, 29 are somewhat behind the machine bed 1 in FIG. 1 and are offset relative to one another in such a manner that an imaginary line connecting them extends parallel to the spindle shaft 40. The displaceability of the jig bushing holder 13 and the counter-holder 16 along the guides 25, 26 of the bridge 4 is thus parallel to the spindle shaft and hence to the feed direction. The displacement of the jig bushing holder 13 is effected by means of a spindle 29 and an actuating drive 30. The displacement of the counter-holder 16 is effected by means of a spindle 31 and an actuating drive 32. As also shown in the drawing, the workpiece clamping table 19 is disposed behind the machine bed 1 in the direction of the spindle shaft 40 and independently of this machine bed 1.

The disposition, independently of the machine bed 1, of a workpiece clamping table that is displaceable in all three coordinate directions (X, Y and Z) works together with the separate displaceability, independent of the machine bed, of the jig bushing holder 13 and counter-holder 16. As a result of the overhead guidance of the jig bushing holder 13 and counter-holder 16 on the guies 25, 26 located above the spindle shaft, maximal travel distances are available for adjustment purposes and thus optimal opportunities are afforded for the disposition of the workpiece. The entire surface area of the workpiece clamping table 19 can thus be utilized for receiving the workpiece, even in the case of workpieces with problematic shapes, the distance of which from the clamping surface 60. Thus it is possible to machine workpieces which could normally not be machined on a deep boring machine of this kind. In particular, it is possible to effect various initial boring situations by means of such a machine. With this manner of clamping the workpiece, it may be possible to dispense with extending the length of the jig bushings as would otherwise be required. As a result, very rigid dispositions of the workpiece and boring tool can be assured even in complex machining processes such as the pull boring shown here. In contrast to the possibilities previously known for clamping the workpiece, it also becomes possible to position the workpiece freely because of the displaceability of the workpiece clamping table 19 in all three coordinate directions.

The apparatus according to the present invention is also particularly well suited for automation, because the jig bushing holder 13 and the counter-holder 16 can be driven apart from one another in the X direction and the workpiece thus made accessible to automatic manipulating devices.

As a result of the separation of the workpiece clamping table 19 from the machine bed, or from the structural components carrying the spindle unit 2, it is assured that no vibration or the like originating in the drive unit is transmitted to the workpiece clamping. As a result, increased precision is attained.

The separate guidance of the jig bushing holder also results in a shorter overall length of the machine, as compared with standard machines having the same boring depth. Finally, it should also be noted that a headstock for rotating workpiece receptacles can also be attached to the counter-holder.

What is claimed is:

1. A deep boring machine, comprising:
 a machine bed;
 a spindle unit including a spindle shaft, said spindle unit being horizontally displaceable on the machine bed;
 a spindle drive for horizontally displacing the spindle unit on the machine bed;
 a boring tool including a boring head attached to one end of the spindle shaft;
 a jig bushing for guiding the boring head during initial boring of a workpiece;
 a jig bushing holder on which the jig bushing is disposed, said jig bushing holder being displaceable in the direction of the spindle shaft;
 guide means for guiding the displacement of the jig bushing holder, said guide means being disposed above and offset parallel to the spindle shaft and extending at least partly beyond the machine bed in the direction of the spindle shaft; and a workpiece clamping table provided adjacent to the machine bed in the direction of the spindle shaft, said workpiece clamping table being adjustable independently of the machine bed.

2. The deep boring machine as defined in claim 1, further comprising:
a drilling oil supply apparatus disposed on the jig bushing holder, said jig bushing being received within the drilling oil supply apparatus.

3. The deep boring machine as defined in claim 1, further comprising:
a counter-holder guided for displacement on said guide means;
actuating drive means for effecting the displacement of the jig bushing holder on said guide means; and
further actuating drive means for effecting the displacement of the counter-holder on said guide means.

4. The deep boring machine as defined in claim 3, further comprising:
a drilling oil supply apparatus disposed on the jig bushing holder, said jig bushing being received within the drilling oil supply apparatus.

5. The deep boring machine as defined in claim 3, further comprising:
a lantern disposed on the counter-holder;
a guide bushing for the boring tool, said guide bushing being mounted within the lantern.

6. The deep boring machine as defined in claim 1, further comprising:
a bridge including said guide means; and
two pillars on which said bridge is disposed, said pillars being offset with respect to the spindle shaft, wherein the workpiece clamping table is disposed between said pillars.

* * * * *